United States Patent
Severtson (10) Patent No.: US 12,264,929 B2
(45) Date of Patent: Apr. 1, 2025

(54) SYSTEMS AND METHODS FOR IDENTIFYING FREQUENTLY TRAVELED ROUTES

(71) Applicant: STATE FARM MUTUAL AUTOMOBILE INSURANCE COMPANY, Bloomington, IL (US)

(72) Inventor: Forrestt Severtson, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 222 days.

(21) Appl. No.: 17/975,401

(22) Filed: Oct. 27, 2022

(65) Prior Publication Data

US 2024/0142252 A1     May 2, 2024

(51) Int. Cl.
*G01C 21/34*     (2006.01)

(52) U.S. Cl.
CPC ..... *G01C 21/3492* (2013.01); *G01C 21/3484* (2013.01)

(58) Field of Classification Search
CPC .......... G01C 21/3492; G01C 21/3484
See application file for complete search history.

(56) References Cited

U.S. PATENT DOCUMENTS 8,355,870 B2 *   1/2013   Link, II ............. G01C 21/3896
                                                                 340/995.13
8,958,985 B1 *   2/2015   Davidson ................ G01C 21/30
                                                                 705/333

(Continued)

FOREIGN PATENT DOCUMENTS

EP     3239686 A1    11/2017
EP     3578433 B1    8/2020

(Continued)

OTHER PUBLICATIONS

Ramer-Douglas-Peucker Algorithm, retrieved from the internet Jan. 26, 2023, https://en.wikipedia.org/wiki/Ramer%E2%80%93Douglas%E2%80%93Peucker_algorithm.

(Continued)

*Primary Examiner* — Calvin Cheung
(74) *Attorney, Agent, or Firm* — MARSHALL, GERSTEIN & BORUN LLP (57) ABSTRACT

Techniques for automatically identifying frequently traveled routes are provided. An example method includes obtaining telematics data associated with routes traveled by one or more drivers; mapping the telematics data associated with each route to respective step functions representative of each of the plurality of routes; comparing, the step functions representative of each of the routes to one another in order to determine a distance between each pair of step functions, of the plurality of step functions; clustering each of the routes into one or more clusters, with each cluster including one or more routes associated with step functions having distances less than a threshold distance from one another; and identifying one or more frequently traveled routes associated with the one or more drivers based on the one or more clusters, with each frequently traveled route being included in a cluster including greater than a threshold number of routes.

17 Claims, 4 Drawing Sheets

(56) References Cited

U.S. PATENT DOCUMENTS

| | | | | |
|---|---|---|---|---|
| 9,672,738 B1 | * | 6/2017 | Ferguson | G08G 1/096811 |
| 9,830,748 B2 | | 11/2017 | Rosenbaum | |
| 9,990,782 B2 | | 6/2018 | Rosenbaum | |
| 10,269,190 B2 | | 4/2019 | Rosenbaum | |
| 10,467,824 B2 | | 11/2019 | Rosenbaum | |
| 10,832,449 B1 | * | 11/2020 | Russo | G01C 21/3647 |
| 11,227,452 B2 | | 1/2022 | Rosenbaum | |
| 11,407,410 B2 | | 8/2022 | Rosenbaum | |
| 11,524,707 B2 | | 12/2022 | Rosenbaum | |
| 11,594,083 B1 | | 2/2023 | Rosenbaum | |
| 2006/0220922 A1 | * | 10/2006 | Brinton | G07C 5/085 340/988 |
| 2013/0226365 A1 | * | 8/2013 | Brozovich | G06Q 10/047 701/1 |
| 2016/0054135 A1 | * | 2/2016 | Fowe | G01C 21/34 701/411 |
| 2016/0320200 A1 | * | 11/2016 | Delling | G01C 21/3605 |
| 2017/0364821 A1 | * | 12/2017 | Mathur | G06N 5/01 |
| 2018/0135989 A1 | * | 5/2018 | Schreier | G01C 21/3655 |
| 2022/0092893 A1 | | 3/2022 | Rosenbaum | |
| 2022/0340148 A1 | | 10/2022 | Rosenbaum | |
| 2023/0060300 A1 | | 3/2023 | Rosenbaum | |
| 2023/0116055 A1 | * | 4/2023 | Smith | H04W 4/029 705/4 |
| 2023/0123323 A1 | * | 4/2023 | Sharifi | G01C 21/3484 701/424 |

FOREIGN PATENT DOCUMENTS

| | | | | |
|---|---|---|---|---|
| EP | 3730375 B1 | 10/2021 | | |
| EP | 3960576 A1 | 3/2022 | | |
| EP | 4190659 A1 | 6/2023 | | |
| EP | 4190660 A1 | 6/2023 | | |
| WO | WO-2017100780 A1 | * | 6/2017 | G01C 21/3415 |

OTHER PUBLICATIONS

Visvalingam-Whyatt Algorithm, retrieved from the Internet Jan. 26, 2023, https://en.wikipedia.org/wiki/Visvalingam%E2%80%93Whyatt_algorithm.

* cited by examiner

Turning Function Representation Of Polygon

202 — Obtain Telematics Data Associated With Routes Traveled By One Or More Drivers 204 — Map Telematics Data Associated With Routes Traveled By One Or More Drivers To Respective Step Functions Associated With Routes 206 — Compare Step Functions Associated With Each Route To One Another In Order To Determine Distances Between Each Pair Of Step Functions 208 — Cluster Step Functions Into Clusters Based On The Distances Between Each Pair Of Step Functions, With Each Cluster Including Step Functions Having Distances Less Than Threshold Distance From One Another 210 — Identify Frequently Traveled Routes Associated With Drivers Based On Clusters, With Each Frequently Traveled Route Included In Cluster Having Greater Than Threshold Number Of Routes

SYSTEMS AND METHODS FOR IDENTIFYING FREQUENTLY TRAVELED ROUTES

FIELD OF THE DISCLOSURE

The present disclosure generally relates to technologies associated with vehicle telematics data and, more particularly, to technologies for automatically identifying frequently traveled routes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle telematics monitoring can involve combining a location determination system (e.g., global positioning system (GPS)) data with on-board monitoring data in order to record and map where a vehicle is located, how fast the vehicle is traveling, how the vehicle is being driven, etc., over time, and, in some examples, cross reference that information with data related to the internal operation of the vehicle.

SUMMARY

According to the present embodiments, techniques are provided for automatically identifying frequently traveled routes.

In one aspect, a computer-implemented method for automatically identifying frequently traveled routes is provided. The method may include automatically identifying frequently traveled routes, comprising: obtaining, by one or more processors, telematics data associated with a plurality of routes traveled by one or more drivers; mapping, by the one or more processors, the telematics data associated with each of the plurality of routes to respective step functions representative of each of the plurality of routes; comparing, by the one or more processors, the step functions representative of each of the plurality of routes to one another in order to determine a distance between each pair of step functions, of the plurality of step functions; clustering, by the one or more processors, each of the plurality of routes into one or more clusters, with each cluster including one or more routes associated with step functions having distances less than a threshold distance from one another; and identifying, by the one or more processors, one or more frequently traveled routes associated with the one or more drivers based on the one or more clusters, with each frequently traveled route being included in a cluster including greater than a threshold number of routes.

In another aspect, a system for automatically identifying frequently traveled routes is provided. The system may include one or more processors; and one or more memories storing instructions that, when executed by the one or more processors, cause the one or more processors to: obtain telematics data associated with a plurality of routes traveled by one or more drivers; map the telematics data associated with each of the plurality of routes to respective step functions representative of each of the plurality of routes; compare the step functions representative of each of the plurality of routes to one another in order to determine a distance between each pair of step functions, of the plurality of step functions; cluster each of the plurality of routes into one or more clusters, with each cluster including one or more routes associated with step functions having distances less than a threshold distance from one another; and identify one or more frequently traveled routes associated with the one or more drivers based on the one or more clusters, with each frequently traveled route being included in a cluster including greater than a threshold number of routes.

In still another aspect, a non-transitory computer-readable medium storing instructions for automatically identifying frequently traveled routes is provided. The instructions, when executed by one or more processors, may cause the one or more processors to obtain telematics data associated with a plurality of routes traveled by one or more drivers; map the telematics data associated with each of the plurality of routes to respective step functions representative of each of the plurality of routes; compare the step functions representative of each of the plurality of routes to one another in order to determine a distance between each pair of step functions, of the plurality of step functions; cluster each of the plurality of routes into one or more clusters, with each cluster including one or more routes associated with step functions having distances less than a threshold distance from one another; and identify one or more frequently traveled routes associated with the one or more drivers based on the one or more clusters, with each frequently traveled route being included in a cluster including greater than a threshold number of routes.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein.

While the systems and methods disclosed herein are susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

Vehicle telematics monitoring can generate large amounts of data. For example, geospatial driving data (e.g., longitude, latitude, time, date, etc.) may be collected every second. For instance, a single driver will typically generate about 90 Mb of telematics data over a few months of driving. The amount of data is compounded by the large number of vehicles on the road, the large number of roads and intersections, etc. Moreover, the vast amounts of conventional telematics data can require large amounts of machine- or computer-readable storage, and processing this telematics data can be extremely computationally intensive.

There is a need to compress this telematics data to improve processing speed, while maintaining the ability to connect routes traveled by drivers to actual road infrastructure associated with the traveled routes. In particular, there is a need for a metric related to traveled roads that can be used to cluster similar routes and identify outlier routes.

The present disclosure provides techniques for automatically identifying frequently traveled routes (FTRs). By using the techniques provided herein to determine FTRs associated with drivers, it is possible to derive features related to risk that are based on an individual's FTR patterns. For instance, features or patterns that may be derived from a driver's FTRs may include a number or percentages of FTRs that are, or are not, round trips, statistics based on durations of FTRs, as well as FTRs based on time of day, day of week, and/or time of year. Moreover, by using the techniques provided herein, it is possible to associate road infrastructure risks with a driver based on that driver's FTRs. For instance, features of the infrastructure of particular route segments, such as steeply banked turns, tight turns, ice or other weather events on segments, known dangerous intersections, etc., can be mapped to a given driver's FTRs that include these route segments in order to determine possible risks associated with the driver based on the driver's FTRs.

Exemplary System for Automatically Identifying Frequently Traveled Routes

Figure 1:
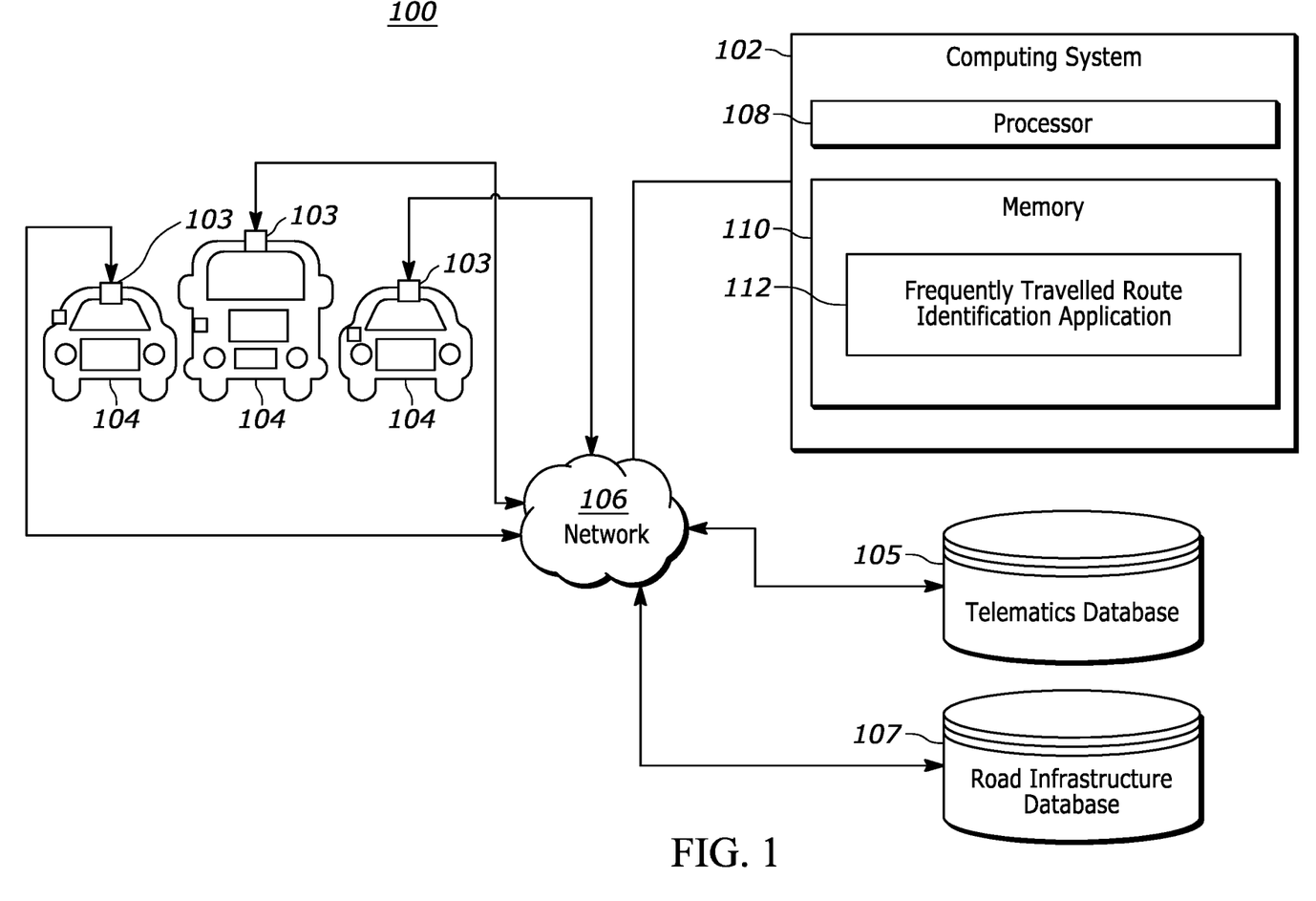
FIG. 1 depicts an exemplary computer system for automatically identifying frequently traveled routes, according to one embodiment.

Referring now to the drawings, FIG. 1 depicts an exemplary system 100 for automatically identifying frequently traveled routes, according to one embodiment. The high-level architecture illustrated in FIG. 1 may include both hardware and software applications, as well as various data communications channels for communicating data between the various hardware and software components, as is described below.

The system 100 may include a computing system 102, which is described in greater detail below with respect to FIG. 4, one or more onboard computing devices 103 associated with one or more respective vehicles 104 (e.g., cars, trucks, motorcycles, etc.), and one or more databases 105 and 107, e.g., configured to communicate with one another via a wired or wireless computer network 106. Although one computing system 102, three onboard computing devices 103, three vehicles 104, two databases 105 and 107, and one network 106 are shown in FIG. 1, any number of such computing systems 102, databases 105 and 107, and networks 106 may be included in various embodiments.

The onboard computing devices 103 may include permanently installed onboard computing systems of the respective vehicles 104, as well as mobile computing devices (such as, e.g., smart phones, tablets, smart watches, fitness trackers, laptop computers, etc.) that are associated with drivers and are temporarily positioned within the respective vehicles 104. Each onboard computing device 103 may include various telematics sensors, including location sensors (e.g., GPS) configured to capture time stamped indications of the location of the respective vehicle 104, accelerometers configured to measure time stamped indications of the speed or acceleration of the respective vehicle 104, etc. The onboard computing devices 103 may transmit data captured by the telematics sensors to the computing system 102 via the network 106.

In some embodiments the computing system 102 may comprise one or more servers, which may comprise multiple, redundant, or replicated servers as part of a server farm. In still further aspects, such server(s) may be implemented as cloud-based servers, such as a cloud-based computing platform. For example, such server(s) may be any one or more cloud-based platform(s) such as MICROSOFT AZURE, AMAZON AWS, or the like. Such server(s) may include one or more processor(s) 108 (e.g., CPUs) as well as one or more computer memories 110.

Memories 110 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 110 may store an operating system (OS) (e.g., Microsoft Windows, Linux, UNIX, etc.) capable of facilitating the functionalities, apps, methods, or other software as discussed herein. Memorie(s) 110 may also store a frequently traveled route identification application 112. Additionally, or alternatively, the memorie(s) 110 may store a telematics dataset, and/or a road infrastructure dataset. For instance, as discussed above, the onboard computing devices 103 may transmit data captured by the telematics sensors to the computing system 102 via the network 106, and the computing system 102 may store the data captured by the telematics sensors as a telematics dataset. These datasets may also be stored in a respective telematics database 105, and/or a road infrastructure database 107, which may be accessible or otherwise communicatively coupled to the computing system 102.

Executing the frequently traveled route identification application 112 may include obtaining telematics data (e.g., from the telematics database 105) associated with multiple routes traveled by a particular driver (and in some cases multiple routes traveled by multiple respective drivers). The frequently traveled route identification application 112 may compress this telematics data, e.g., using the Ramer-Douglas-Peucker algorithm, or the Visvalingam-Whyatt algorithm. For example, the frequently traveled route identification application 112 may compress the telematics data by up to 75% using one of these algorithms. Using the compressed telematics data, the frequently traveled route identification application 112 may map telematics data representative of a route to a step function.

That is, the telematics data representative of a route traveled by a vehicle may include data points such as: $[(lat_1, lon_1, time_1), (lat_2, lon_2, time_2), \ldots, (lat_n, lon_n, time_n)]$, where "lat" refers to latitude and "lon" refers to longitude. The frequently traveled route identification application 112 may map this data to a step function by converting these data points to data points that indicate the direction that the vehicle is moving over time. The data points that indicate the direction that the vehicle is moving over time may be written as: $[(t_1, \varphi_1=0), (t_2, \varphi_2), \ldots, (t_k, \varphi_k)]$, where t refers to points in time, and (p refers to the angle of the vehicle's path from the vehicle's previous path in polar coordinates, e.g., such that $\varphi_k \in [-\pi/2, \pi/2]$. For instance, if the first turn was a 90 degree turn, $\varphi_1$ would be $\pi/2$ for a left turn, or $-\pi/2$ for a right turn. In some examples, the time data may be scaled/normalized to a value representing the entirety of the route, such as a value of "1", i.e., such that $t_k \in [0, 1]$, regardless of the actual length of the journey. For instance, if the route took 60 minutes, 6 minutes of the route may be represented by a scaled time value of 0.1 when the route is normalized to a value of 1. Similarly, if the route took 100 minutes, 20 minutes of the route may be represented by a scaled time value of 0.2 when the route is normalized to a value of 1.

Figure 2A:
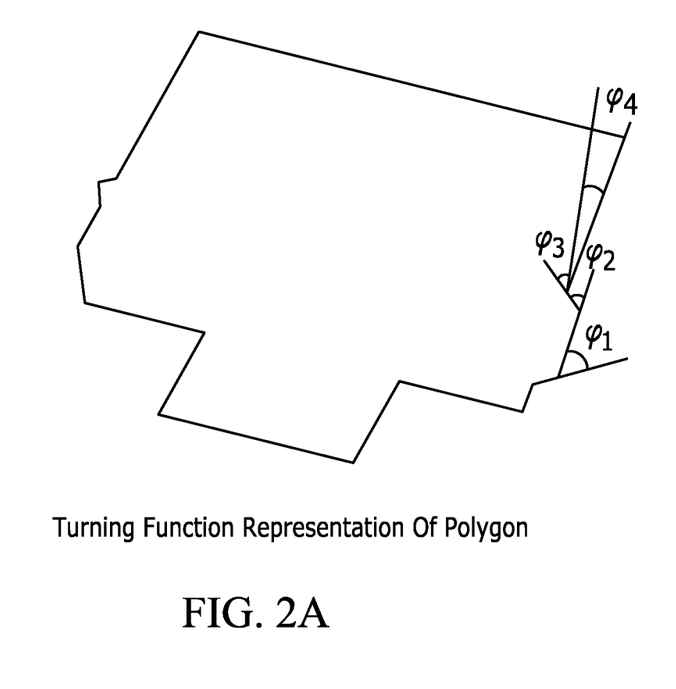
FIG. 2A depicts an exemplary turning function representation of a polygon, according to one embodiment.
Figure 2B:
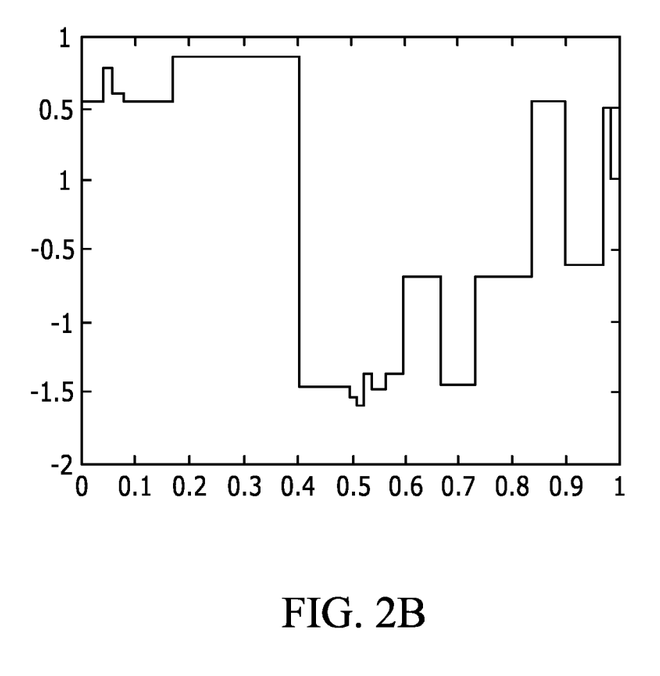
FIG. 2B depicts an exemplary step function, as may be mapped from a turning function representation of a polygon as shown at FIG. 2A, according to one embodiment.

For example, FIG. 2A illustrates a visualization of telematics data representative of a route traveled by a vehicle. As shown at FIG. 2A, the φ value changes each time the vehicle makes a turn, such that $\varphi_1$ is a first angle in polar coordinates after the vehicle makes a first turn, $\varphi_2$ is a second angle in polar coordinates after the vehicle makes a second turn, $\varphi_3$ is a third angle in polar coordinates after the vehicle makes a third turn, $\varphi_4$ is a fourth angle in polar coordinates after the vehicle makes a fourth turn, etc. FIG. 2B illustrates a representation of a step function, such as a step function that the frequently traveled route identification application 112 may generate based on the telematics data representative of the route traveled by the vehicle as shown at FIG. 2A. As shown at FIG. 2B, the x-axis may include time values, with the time data associated with the route may be scaled/normalized to a value representing the entirety of the route, such as a value of "1," as discussed above. Furthermore, as shown at FIG. 2B, the y-axis may include angle (φ) values from $-\pi/2$ to $\pi/2$ (e.g., from ~-1.6 to ~1.6), such that each time the vehicle makes a turn, the φ value represents the angle of the new direction of the vehicle from the previous direction of the vehicle, and the φ value remains the same until the vehicle makes a new turn. That is, the step function takes on the value φ1 from 0 to t1 (the time at which a first turn is made), and takes on the value φ2 from t1 to t2 (the time at which a second turn is made), etc.

Referring back to FIG. 1, executing the frequently traveled route identification application 112 may include comparing the step functions resulting from the telematics data from each route in order to determine which routes are similar to one another. For example, an $L^2$ norm (also called Euclidean norm) may be calculated in order to measure the "distance" between two routes, such that two routes with a lower $L^2$ norm value are more similar than two routes with a higher $L^2$ norm value. Similar routes (e.g., in some cases, routes with an $L^2$ norm value below a threshold $L^2$ norm value) may be clustered together and labeled as frequently traveled routes (FTRs) for a given driver or for a group of drivers.

Furthermore, executing the frequently traveled route identification application 112 may include identifying actual route segments (i.e., actual portions of real physical roads) that correspond to the routes labeled as FTRs for the given driver or for the group of drivers, e.g., by accessing road infrastructure data stored at the road infrastructure database 107 and comparing the identified FTRs to actual roads. For instance, the road infrastructure database may store maps of various roads, along with indications of features associated with each road segment. In some examples, the frequently traveled route identification application 112 may compare maps of roads stored at the road infrastructure database 107 directly to the telematics data, e.g., to the latitudes and longitudes associated with telematics data points plotted as shown at FIG. 2A, in order to identify likely actual route segments corresponding to FTRs. Moreover, in some examples, step functions may be generated for roads stored at the road infrastructure database 107 and compared to step functions associated with the telematics data, e.g., as shown at FIG. 2B, in order to identify likely actual route segments corresponding to FTRs. Additionally, in some examples, identifying actual route segments that correspond to the identified FTRs may include comparing the identified FTRs to actual route segments using any of the techniques discussed in greater detail with respect to U.S. Pat. No. 11,372, 902, U.S. patent application Ser. No. 17/022,788, U.S. patent Ser. No. 17/464,343, and U.S. patent Ser. No. 17/364, 390, each of which are incorporated by reference herein in their entirety.

Moreover, executing the frequently traveled route identification application 112 may include identifying risks associated with FTRs for a given driver or group of drivers based on the identified actual route segments corresponding to each FTR. For instance, the road infrastructure database 107 may store indications of safety concerns associated with each route segment, including, for instance, steep inclines or declines, steeply banked turns, sharp or tight turns, deteriorating road conditions, potholes or cracks, frequency of flooding and/or ice conditions, frequency of accidents/collisions, traffic levels etc., associated with each route segment. The frequently traveled route identification application 112 may use the safety concerns associated with a driver or a group of drivers' FTRs, along with factors such as the dates or times at which the driver or group of drivers travel the FTRs, to generate a risk score for the driver or group of drivers. For instance, in some examples, an insurance provider could provide the driver or the group of drivers a discount (e.g., on premium payments) based on the risk scores associated with the driver or the group of drivers.

In addition to the frequently traveled route identification application 112, memories 110 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 108. It should be appreciated that given the state of advancements of mobile computing devices, all of the processes functions and steps described herein may be present together on a mobile computing device (e.g., user computing device 104).

Furthermore, in some examples, the computer-readable instructions stored on the memory 110 may include instructions for carrying out any of the steps of the method 200 via an algorithm executing on the processors 108, which is described in greater detail below with respect to FIG. 3.

Figure 3:
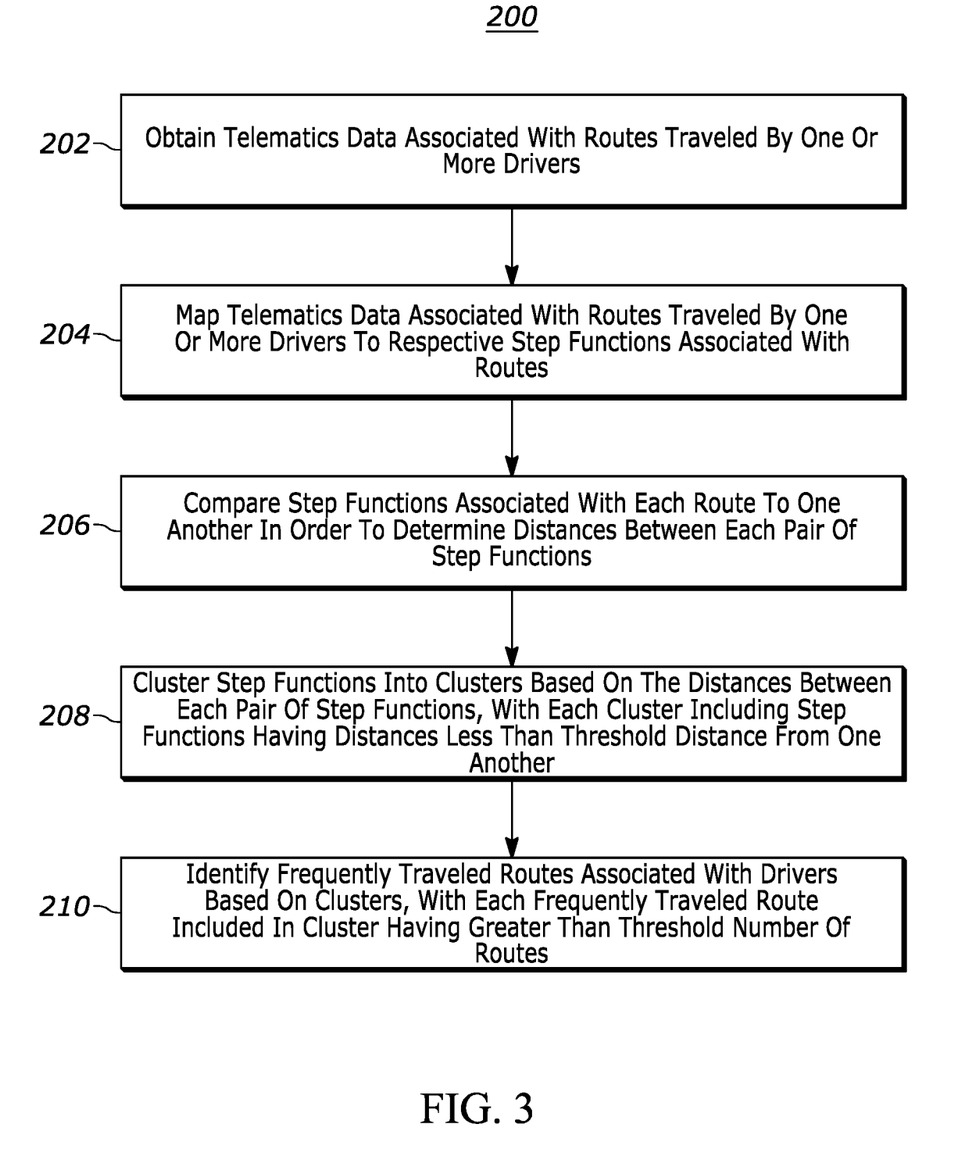
FIG. 3 depicts a flow diagrams of an exemplary computer-implemented method for automatically identifying frequently traveled routes, according to one embodiment.

Exemplary Computer-Implemented Method for Automatically Identifying Frequently Traveled Routes FIG. 3 depicts a flow diagram of an exemplary computer-implemented method 200 for automatically identifying frequently traveled routes, according to one embodiment. One or more steps of the method 200 may be implemented as a set of instructions stored on a computer-readable memory (e.g., memory 110) and executable on one or more processors (e.g., processor 108).

The method 200 may include obtaining (block 202) telematics data associated with a plurality of routes traveled by one or more drivers.

The telematics data associated with each of the plurality of routes may be mapped (block 204) to respective step functions representative of each of the plurality of routes. In some examples, the telematics data may be compressed prior to mapping the telematics data to the respective step functions representative of each of the plurality of routes.

Generally speaking, mapping the telematics data to the respective step functions representative of each of the plurality of routes may include first plotting the telematics data associated with the plurality of routes using linear coordinates representing latitudes and longitudes of each telematics data point, e.g., as shown at FIG. 2A. Each telematics data point may also be associated with a time value, which may not necessarily be plotted. For each route, angles representing changes the direction of the vehicle during the route may be identified, e.g., based on the telematics data as mapped using linear coordinates, as shown at FIG. 2A. Mapping the telematics data associated with each of the routes to respective step functions representative of each of the plurality of routes may include plotting each of the identified angles against time values associated with telematics data points during which the vehicle is traveling at each identified angle, e.g., as shown at FIG. 2B. The time values associated with each route of the plurality of routes, as plotted in the respective step functions representative of each route of the plurality of routes, may be normalized such that the normalized total amount of time associated with each route of the plurality of routes is the same amount of time. For instance, the total amount of time associated with each route may be normalized to "1".

The step functions representative of each of the plurality of routes may be compared (block 206) to one another in order to determine a distance between each pair of step functions, of the plurality of step functions. For instance, determining a distance between each pair of step functions may include calculating an $L^2$ norm for each pair of step functions.

Each of the plurality of routes may be clustered (block 208) into one or more clusters, with each cluster including one or more routes associated with step functions having distances less than a threshold distance from one another.

One or more frequently traveled routes (FTRs) associated with the one or more drivers may be identified (block 210) based on the one or more clusters, with each FTR being included in a cluster including greater than a threshold number of routes.

In some examples, the method 200 may further include identifying actual route segments that correspond to the routes labeled as FTRs for each driver, as well as identifying risks associated with FTRs for each driver, based on the identified actual route segments corresponding to each FTR. For instance, safety concerns associated with each route segment, including, for instance, steep inclines or declines, steeply banked turns, sharp or tight turns, deteriorating road conditions, potholes or cracks, frequency of flooding and/or ice conditions, frequency of accidents/collisions, traffic level, etc., associated with each route segment, along with factors such as the dates or times at which the driver typically travels the FTRs, to generate a risk score for the driver. For instance, in some examples, the method may include providing the driver with a discount (e.g., on premium payments) based on the risk score that is generated for the driver.

Additionally, in some examples, the method 200 may include identifying routes that are less risky and/or more efficient than a driver's FTRs, and that start and end at the same points as the driver's FTRs, and providing indications of those routes (e.g., including maps and/or other navigation) to the driver, e.g., at dates and/or times at which the driver typically travels the FTRs. The method 200 may include providing these identified routes via an onboard computing device 103, or via another mobile computing device (such as, e.g., a smart phone, tablet, smart watch, fitness tracker, laptop computer, etc.) that is associated with the driver.

Figure 4:
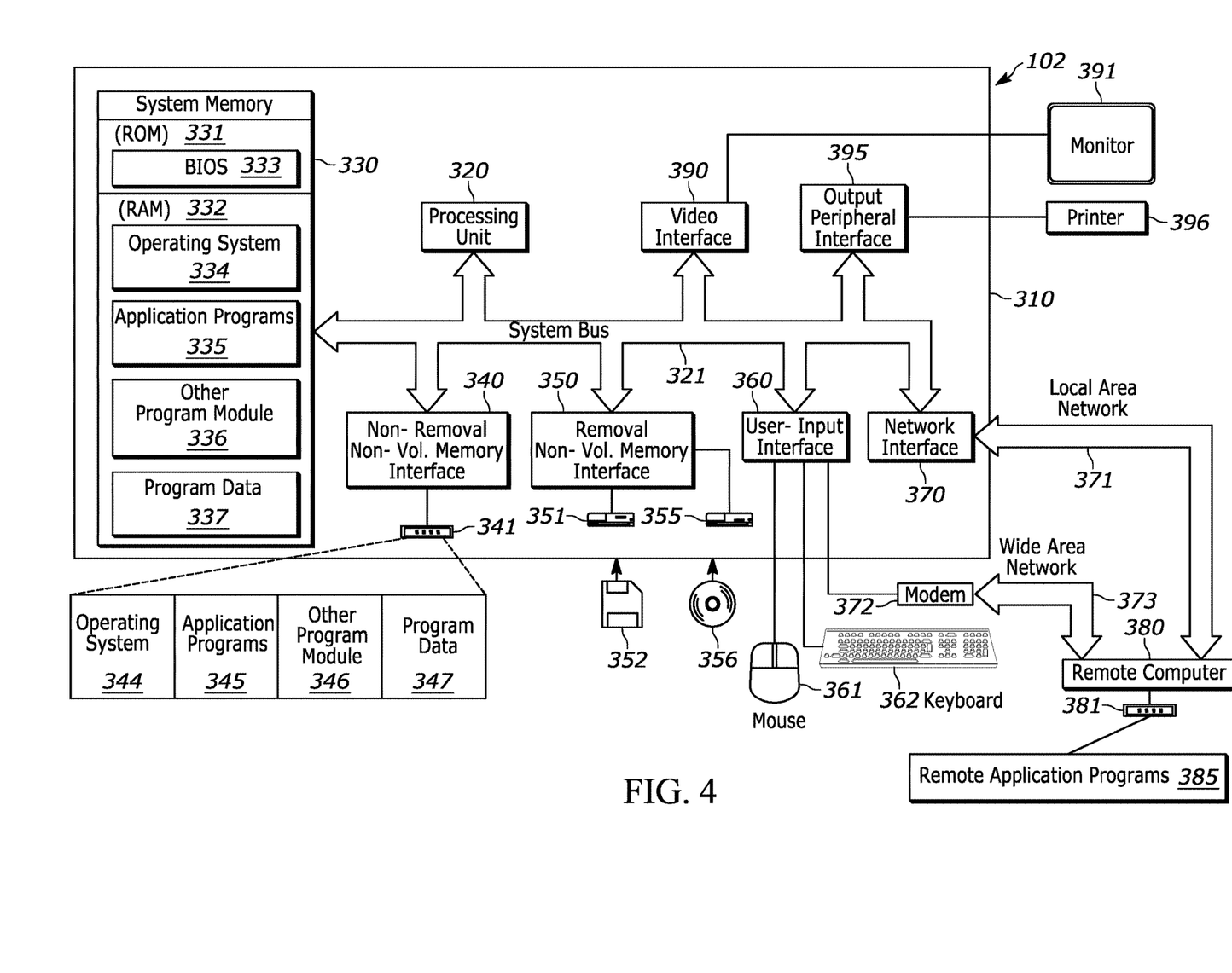
FIG. 4 depicts an exemplary computing system for a automatically identifying frequently traveled routes in which the techniques described herein may be implemented, according to one embodiment.

Exemplary Computing System for Automatically Identifying Frequently Traveled Routes FIG. 4 depicts an exemplary computing system 102 in which the techniques described herein may be implemented, according to one embodiment. The computing system 102 of FIG. 4 may include a computing device in the form of a computer 310. Components of the computer 310 may include, but are not limited to, a processing unit 320 (e.g., corresponding to the processor 120 of FIG. 1), a system memory 330 (e.g., corresponding to the memory 122 of FIG. 1), and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media.

Computer storage media may include volatile and non-volatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 4 illustrates operating system 334, application programs 335 (e.g., corresponding to the frequently traveled route identification application 112 of FIG. 1), other program modules 336, and program data 337.

The computer 310 may also include other removable/non-removable, volatile/nonvolatile computer storage media. By way of example only, FIG. 4 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 4 provide storage of computer-readable instructions, data structures, program modules and other data for the computer 310. In FIG. 4, for example, hard disk drive 341 is illustrated as storing operating system 344, application programs 345, other program modules 346, and program data 347. Note that these components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a mobile computing device, personal computer, a server, a router, a network PC, a peer device or other common network node, and may include many or all of the elements described above relative to the computer 310, although only a memory storage device 381 has been illustrated in FIG. 4. The logical connections depicted in FIG. 4 include a local area network (LAN) 371 and a wide area network (WAN) 373 (e.g., either or both of which may correspond to the network 106 of FIG. 1), but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 4 illustrates remote application programs 385 as residing on memory device 381.

The techniques for automatically identifying frequently traveled routes described above may be implemented in part or in their entirety within a computing system such as the computing system 102 illustrated in FIG. 4. In some such embodiments, the LAN 371 or the WAN 373 may be omitted. Application programs 335 and 345 may include a software application (e.g., a web-browser application) that is included in a user interface, for example.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for automatically identifying frequently traveled routes. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for automatically identifying frequently traveled routes, comprising:
    obtaining, by one or more processors, telematics data associated with a plurality of routes traveled by one or more drivers;
    compressing, by the one or more processors, using a line simplification algorithm, the telematics data associated with the plurality of routes traveled by the one or more drivers;
    mapping, by the one or more processors, the compressed telematics data associated with each of the plurality of routes to respective step functions representative of each of the plurality of routes by plotting, for each route of the plurality of routes, angles representing changes in direction of a vehicle during the route against time values during which the vehicle is traveling at each angle during the route in a step function representative of the route;
    comparing, by the one or more processors, the respective step functions representative of each of the plurality of routes to one another;
    determining, by the one or more processors, based on comparing the respective step functions representative of each of the plurality of routes to one another, a distance between each pair of step functions;
    clustering, by the one or more processors, each of the plurality of routes into one or more clusters, with each cluster including one or more routes associated with step functions having distances less than a threshold distance from one another; and
    identifying, by the one or more processors, one or more frequently traveled routes associated with the one or more drivers based on the one or more clusters, with each frequently traveled route being included in a cluster including greater than a threshold number of routes.

2. The computer-implemented method of claim 1, further comprising:
    plotting, by the one or more processors, the telematics data associated with the plurality of routes traveled by the one or more drivers using linear coordinates representing latitudes and longitudes of each telematics data point, wherein each telematics data point is associated with a time value.

3. The computer-implemented method of claim 1, wherein the time values associated with each route of the plurality of routes, as plotted in the respective step functions representative of each route of the plurality of routes, are normalized such that a normalized total amount of time associated with each route of the plurality of routes is a same amount of time.

4. The computer-implemented method of claim 1, wherein determining the distance between each pair of step functions includes calculating an $L^2$ norm for each pair of step functions.

5. The computer-implemented method of claim 1, wherein the line simplification algorithm is the Ramer-Douglas-Peucker algorithm.

6. The computer-implemented method of claim 1, wherein the line simplification algorithm is the Visvalingam-Whyatt algorithm.

7. A system for automatically identifying frequently traveled routes, comprising:
    one or more processors; and
    one or more memories storing instructions that, when executed by the one or more processors, cause the one or more processors to:
        obtain telematics data associated with a plurality of routes traveled by one or more drivers;
        compress, using a line simplification algorithm, the telematics data associated with the plurality of routes traveled by the one or more drivers;
        map the compressed telematics data associated with each of the plurality of routes to respective step functions representative of each of the plurality of routes by plotting, for each route of the plurality of routes, angles representing changes in direction of a vehicle during the route against time values during which the vehicle is traveling at each angle during the route in a step function representative of the route;
        compare the respective step functions representative of each of the plurality of routes to one another;
        determine, based on comparing the respective step functions representative of each of the plurality of routes to one another, a distance between each pair of step functions;
        cluster each of the plurality of routes into one or more clusters, with each cluster including one or more routes associated with step functions having distances less than a threshold distance from one another; and
        identify one or more frequently traveled routes associated with the one or more drivers based on the one or more clusters, with each frequently traveled route being included in a cluster including greater than a threshold number of routes.

8. The system of claim 7, wherein the instructions, when executed by the one or more processors, further cause the one or more processors to:

plot the telematics data associated with the plurality of routes traveled by the one or more drivers using linear coordinates representing latitudes and longitudes of each telematics data point, wherein each telematics data point is associated with a time value.

9. The system of claim 7, wherein the time values associated with each route of the plurality of routes, as plotted in the respective step functions representative of each route of the plurality of routes, are normalized such that a normalized total amount of time associated with each route of the plurality of routes is a same amount of time.

10. The system of claim 7, wherein determining a distance between each pair of step functions includes calculating an $L^2$ norm for each pair of step functions.

11. The system of claim 7, wherein the line simplification algorithm is the Ramer-Douglas-Peucker algorithm.

12. The system of claim 7, wherein the line simplification algorithm is the Visvalingam-Whyatt algorithm.

13. A non-transitory, computer-readable medium storing instructions for automatically identifying frequently traveled routes that, when executed by one or more processors, cause the one or more processors to:

obtain telematics data associated with a plurality of routes traveled by one or more drivers;

compress, using a line simplification algorithm, the telematics data associated with the plurality of routes traveled by the one or more drivers;

map the compressed telematics data associated with each of the plurality of routes to respective step functions representative of each of the plurality of routes by plotting, for each route of the plurality of routes, angles representing changes in direction of a vehicle during the route against time values during which the vehicle is traveling at each angle during the route in a step function representative of the route;

compare the respective step functions representative of each of the plurality of routes to one another;

determine, based on comparing the respective step functions representative of each of the plurality of routes to one another, a distance between each pair of step functions;

cluster each of the plurality of routes into one or more clusters, with each cluster including one or more routes associated with step functions having distances less than a threshold distance from one another; and identify one or more frequently traveled routes associated with the one or more drivers based on the one or more clusters, with each frequently traveled route being included in a cluster including greater than a threshold number of routes.

14. The non-transitory, computer-readable medium of claim 13, wherein the instructions, when executed by the one or more processors, further cause the one or more processors to:

plot the telematics data associated with the plurality of routes traveled by the one or more drivers using linear coordinates representing latitudes and longitudes of each telematics data point, wherein each telematics data point is associated with a time value.

15. The non-transitory, computer-readable medium of claim 13, wherein the time values associated with each route of the plurality of routes, as plotted in the respective step functions representative of each route of the plurality of routes, are normalized such that a normalized total amount of time associated with each route of the plurality of routes is a same amount of time.

16. The non-transitory, computer-readable medium of claim 13, wherein the line simplification algorithm is the Ramer-Douglas-Peucker algorithm.

17. The non-transitory, computer-readable medium of claim 13, wherein the line simplification algorithm is the Visvalingam-Whyatt algorithm.

* * * * *